(12) United States Patent
Vogel et al.

(10) Patent No.: US 7,130,283 B2
(45) Date of Patent: Oct. 31, 2006

(54) VARIABLE BANDWIDTH SATELLITE COMMUNICATION TECHNIQUES

(75) Inventors: Richard L. Vogel, Palos Verdes Estates, CA (US); William F. Courtney, Long Beach, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 954 days.

(21) Appl. No.: 09/812,022

(22) Filed: Mar. 19, 2001

(65) Prior Publication Data

US 2002/0131375 A1    Sep. 19, 2002

(51) Int. Cl.
*H04B 7/212* (2006.01)

(52) U.S. Cl. ............... 370/322; 370/348; 370/395.41; 370/468

(58) Field of Classification Search ............... 370/322, 370/462, 438, 252, 468, 321, 352, 329, 280, 370/241, 485, 487, 345.21, 277, 278, 279, 370/293, 294, 295, 315, 319, 326, 337, 344, 370/347, 349, 395.64, 395.65, 395.2, 316, 370/323, 341, 395.21, 395.41, 437, 439, 370/443, 465, 422; 455/69

See application file for complete search history.

(56) References Cited

U.S. PATENT DOCUMENTS

| | | | | |
|---|---|---|---|---|
| 4,625,308 | A * | 11/1986 | Kim et al. | 370/321 |
| 5,274,627 | A * | 12/1993 | De Santis | 370/307 |
| 5,570,355 | A * | 10/1996 | Dail et al. | 370/352 |
| 5,581,555 | A * | 12/1996 | Dubberly et al. | 370/487 |
| 5,594,726 | A * | 1/1997 | Thompson et al. | 370/485 |
| 5,719,872 | A * | 2/1998 | Dubberly et al. | 370/487 |
| 5,790,523 | A * | 8/1998 | Ritchie et al. | 370/241 |
| 5,982,761 | A * | 11/1999 | Dutta | 370/337 |
| 6,016,311 | A * | 1/2000 | Gilbert et al. | 370/280 |
| 6,366,761 | B1 * | 4/2002 | Montpetit | 455/12.1 |
| 6,377,561 | B1 * | 4/2002 | Black et al. | 370/330 |
| 6,505,034 | B1 * | 1/2003 | Wellig | 455/69 |
| 6,563,829 | B1 * | 5/2003 | Lyles et al. | 370/395.21 |
| 6,567,387 | B1 * | 5/2003 | Dulin et al. | 370/329 |
| 6,597,668 | B1 * | 7/2003 | Schafer et al. | 370/280 |
| 6,829,221 | B1 * | 12/2004 | Winckles et al. | 370/238 |
| 6,831,892 | B1 * | 12/2004 | Robinett et al. | 370/232 |
| 2002/0003776 | A1 * | 1/2002 | Gokhale et al. | 370/236 |
| 2002/0009058 | A1 * | 1/2002 | Kelly et al. | 370/316 |
| 2002/0018450 | A1 * | 2/2002 | McKenna et al. | 370/328 |
| 2002/0036997 | A1 * | 3/2002 | Kim et al. | 370/335 |
| 2003/0169722 | A1 * | 9/2003 | Petrus et al. | 370/347 |

* cited by examiner

*Primary Examiner*—Phirin Sam
(74) *Attorney, Agent, or Firm*—Tarolli, Sundheim, Covell & Tummino LLP (57) ABSTRACT

Multiple bandwidth requestors (220), a bandwidth manager (420) and a forward link (410) from the bandwidth manager to the bandwidth requestors are used to allocate bandwidth in a return link beam (210). The uplink bandwidth allocation is preferably based on the information to be transmitted provided by the user Automatic Data Processing Equipment (ADPE) (300) and overall system data loading. The preferred method exercised by the bandwidth manager (420) allocates bandwidth on the return link (210) to individual user terminals in either a minimal rate required for the protocol being exercised (213), a committed information rate required for the services being requested, or a fair share rate (214) that allows maximum transfer of data from the user terminal (201) to the gateway (400).

46 Claims, 10 Drawing Sheets

VARIABLE BANDWIDTH SATELLITE COMMUNICATION TECHNIQUES

BACKGROUND OF THE INVENTION

This invention relates to communication satellite systems and more particularly relates to bandwidth allocation techniques for such systems.

Current satellite communication systems rely on bulk bandwidth allocation. The current Single Carrier per Channel (SCPC) and Time Division Multiplexing (TDM) systems allocate a fixed bandwidth for the duration of a user's session. This requires that the user actively initiate and terminate a data transfer session. For this reason, the bandwidth utilization can vary drastically based on the type of activity being performed. For rapid transfer of data the bandwidth has to be over allocated and under utilized.

Communication over satellites is characterized by large propagation delays for a geostationary satellite, the one-way delay between a user and the satellite or the two-way delay between two users is a minimum of 250 milliseconds. Yet, users must share a common resource: the uplink bandwidth. Just as communications between users is subject to large delays, so also is the communication between users and the bandwidth manager (BWM) responsible for allocating uplink bandwidth among users.

The propagation delay makes it extremely difficult for the BWM to be responsive to the bandwidth needs of the system's users. Traditionally, designers have either allocated fixed amounts of bandwidth to each user for relatively long periods (allocating each user a circuit, in effect), so that each user would have adequate bandwidth under any circumstance (a committed information rate (CIR) approach), or they have insisted that each user request every small amount of bandwidth that they need, so that users would get only the bandwidth that they could actually use (the bandwidth-on-demand approach).

The CIR approach is wasteful of bandwidth in several ways. It ignores the fluctuation in use of bandwidth caused by users downloading or uploading and then pausing between operations. It ignores the asymmetry in consumption of user uplink bandwidth between downloads and uploads when the user is downloading a file, he needs to uplink only an occasional acknowledgement back to the sender, but when he is uploading a file, he will uplink large amounts of data. It ignores the variations in bandwidth utilization that occur over the course of a single upload or download establishment and termination of a file transfer use very small amounts of bandwidth compared with the bandwidth used to transfer the file. However, the CIR approach provides very good quality of service (QoS), because the user always has as much bandwidth as he could have expected.

The bandwidth-on-demand approach, on the other hand, is very efficient in its allocation of bandwidth. In this approach, users request bandwidth only when they have data to send, and they request only as much bandwidth as they need to send their backlogged data. Thus, almost all the allocated bandwidth is actually used. However, the bandwidth on-demand approach can drastically cut throughput, and the QoS as perceived by the user can be terrible. The system operates in fits and starts, as users have backlogged data, request a limited amoutn of short-term bandwidth, wait through the delay to get bandwidth, send data, and then repeat the process. While there are methods that partially ameliorate the problems with the bandwidth-on-demand approach, its service quality still remains poor.

This invention addresses these problems and provides a solution.

BRIEF SUMMARY OF THE INVENTION

The preferred embodiment is useful in a satellite communication system including an uplink and a bandwidth manager storing bandwidth release parameters. The system is subject to user agreement terms and to system data loading. In such an environment, uplink bandwidth is allocated among user terminals of the system subject to terminal data loading. Preferably, initial bandwidth allocations of the uplink bandwidth are assigned for one or more of the user terminals. Fair shares of the uplink bandwidth allocated to one or more of the user terminals are assigned based on one or more of the system data loading, the terminal data loading and the user agreement terms. Uplink bandwidth previously allocated to one or more of the user terminals is released based on one or more of the terminal data loading and the bandwidth release parameters.

By using the foregoing techniques, data may be transmitted from user terminals through a satellite with an improved degree of efficiency. For example, significantly more users can be supported without increasing the available bandwidth by allocating bandwidth on an as-needed basis. This is done in a manner that still allows a user to upload and download files rapidly. Thus, the preferred techniques are both bandwidth-efficient and capable of supplying good quality of service.

DETAILED DESCRIPTION OF THE PREFERRED EMBODIMENTS

The preferred embodiments combine the following seven features to create a Variable Bandwidth Allocation (VBA) scheme that allows a central bandwidth allocation manager to maximize the utilization of a shared bandwidth resource without undo impact on the individual users performance. The VBA scheme can be tailored to the protocol and activity being supported by the satellite network to include less than the full set of features and still provide better link efficiency than currently available allocation protocols 1) Dedicated allocation for dedicated services: No remote allocation approach can provide the required QoS for VoIP or IP teleconferencing without a dedicated allocation. The VBA gives these applications a priority service. The VBA makes this allocation on the basis of the resource reservation protocol (RSVP) request for this type of service.

2) Low rate start up: Since most of the initial user traffic for interactive packet based communication is at a very low rate and is inherently slowed by the delays through the satellite interface, the VBA will allocate initial bandwidth share for a user terminal at a rate of less than ⅛ of the maximum share.

3) Full allocation when loaded: The user terminal can determine its need to go to its full allocation by the amount of data in its input buffers. If the user terminal includes a TCP boosting application or the IP stack on the user terminals have been optimized for satellite communications (no slow start, a long window), the direction of the bulk of the data transfer can be easily discerned. The VBA will allocate full share bandwidth when a user terminal recognizes this condition and requests full share bandwidth.

4) Fair Share Allocation: When the VBA allocates bandwidth to active users, it will allocate all available bandwidth based on the users' needs and fair share of available bandwidth. This allows user sessions to complete earlier in periods of low activity and allows the system to support more than the normal user maximum for short bursts during periods of high user activity.

5) Initial burst allocation: When the user terminal initiates a bandwidth request, it knows the size of the IP packet in its input buffer. For lower class of service users whose minimal bandwidth rate is very low, it could take the better part of a second to send an initial large packet. The VBA can allocate an initial burst of bandwidth at fair share rate when the user terminal includes this information in the original bandwidth access request.

6) Combined bandwidth request/initial packet: For the TCP connection open, there may be enough space in the bandwidth request slot to hold both the bandwidth request and the initial TCP/IP SYN packet. In this case, the VBA would have the user terminal include these both in the bandwidth request slot. This combination of messages shortens a user's session by one round-trip 7) Load based de-allocation: The VBA can increase single user performance without impacting system performance by varying the condition under which a user is changed from full allocated bandwidth to minimum allocated bandwidth to no allocated bandwidth based on the system loading. By increasing the duration of a user bandwidth allocation during periods of low system loading and decreasing the de-allocation lag in periods of heavy utilization, the VBA can offer improved data transfer efficiency.

The examples used to explain the preferred embodiments of this invention show how it can support typical TCP/IP based data transfers. The schemes shown can be tailored to other protocol sets.

The preferred embodiments address the problem of efficient allocation of return bandwidth in a satellite-based communications architecture. It also addresses the problem of providing to a user an "always-connected" paradigm rather than force the user to initiate all transfers with a dial up like activity. The delays created by satellite communication preclude the normal always-connected bandwidth on demand techniques seen in local systems like a data over cable service interface specification (DOCSIS) based cable network. The current art for satellite communication systems is user-initiated, connection-oriented, bulk-bandwidth allocation. The current art for satellite communication systems is user-initiated, connection-oriented, bulk-bandwidth allocation.

In general, the preferred embodiment uses a Variable Bandwidth Protocol (VBP). The VBP is designed to support a larger user population than could be supported with a Committed Information Rate (CIR) protocol while, at the same time, provide better throughput and quality of service (QoS) than could be supported with a strict bandwidth-on-demand protocol.

The VBP approach avoids the negative excesses of the CIR and the bandwidth-on-demand approaches. Use of the VBP increases the capacity of the system (number of users supported) by a large amount compared to the capacity of the same system using CIR. At the same time, VBP gives QoS that rivals that of CIR.

VBP includes the ability to support commitment to RSVP services, which may be required by user agreements. RSVP is a very strict demand for fixed bandwidth. Voice over IP (VoIP) is expected to use RSVP to ensure that Internet phone calls do not experience unacceptable delay or packet loss. If the system were operating as a simple "best effort" provider, we could accept short intervals of overloading where the system performance of specific connections is degraded. RSVP cannot accept such a degradation. VBP "fences off" bandwidth committed via RSVP, ensuring that all guarantees to those sessions are met. It treats these high QoS sessions the same way that CIR treats them. For the rest of the sessions, VBP applies the bandwidth-efficient, good QoS approach described below.

More specifically, the VBP matches the potential data demand profiles of the domain name server (DNS) retrievals and TCP/IP sessions based on the underlying activity in the session. The approach begins with assigning an allocation that is tailored to the initial action, that is dropped to a minimum bandwidth allocation that supports TCP/IP over a satellite link, and then is increased to a bandwidth appropriate to the direction of the data transfer after the TCP connection has been established. It operates based on only the limited information provided by the IP packet loading to select the proper allocation. The preferred embodiment operates by having the user terminal report its bandwidth condition to a bandwidth manager (BWM). The bandwidth manager can assign the allocation of bandwidth based on the end point requirements, the system data loading, the user terminal data loading and user agreement terms to achieve a high utilization of the shared resource while still providing acceptable service to the users.

VBP efficiently allocates return (i.e., uplink) bandwidth. The allocation of the return link involves the classic trades of efficiency vs. delay. The lag between request and allocation is at least the round trip time through the air interface.

If we were to make the user terminals request bandwidth only when they had data and grant only enough bandwidth to service their request, then the return link would be used efficiently but the individual performance would be atrocious. On the other hand, a true CIR allocation in the return link, as described above, minimizes the delays but leads to poor utilization. In the return direction, the VBP can provide better effective performance by tailoring the user terminal bandwidth allocation to the needs of the user. In order to create any saving we recognize the characteristics of a session.

Because users are connected for a period much longer than they are active, a user may have his bandwidth reduced to zero after some period of inactivity.

The users who require variable bandwidth are engaging in TCP/IP sessions with a pattern of activity that is the same regardless of the application. A TCP/IP connection will follow this pattern:

(1) a DNS request to resolve the IP address of the end service;
(2) a three-way-handshake to establish a TCP connection;
(3) transmission of file data using TCP; and
(4) a modified handshake to close a TCP connection.

The first two and the last of these activities (i.e., (1), (2) and (4)) require very little return bandwidth because they transmit data delivery information, they do not transmit the information sought to be transferred, such as file information. If the file transfer is toward the user terminal, that activity also requires little return bandwidth.

Users may begin their data transfer session with any one of the four steps described above. For example, the DNS for a mail server or Hyper Text Transfer Protocol (HTTP) proxy could have been resolved in the previous session or a TCP connection could already exist between the user and the server.

For TCP/IP connections, the real bandwidth demand is unknown until the file transfer phase. Then it can be a one-way rush of data from the server to the user with acknowledgements-only in the return direction (server file transfers, Hyper Text Transfer Protocol (HTTP) proxy services, file transfer protocol (FTP) services), or it can be a very bursty conversation (normal http, client/server application).

The users who require dedicated bandwidth (VoIP, Teleconferencing, etc) are usually engaged in a User Datagram Protocol (UDP) based protocol. For these sessions, the system has committed to a rate via RSVP, and it cannot attempt to optimize their use of return bandwidth.

VBP addresses these issues with an approach that limits the amount of wasted return bandwidth without unduly impacting user performance. The VBP allocation approach uses the following techniques to optimize the use of the return link.

Dedicated Allocation for Dedicated Services

No remote allocation approach can provide the required QoS for VoIP or EP teleconferencing without a dedicated allocation. These applications will be given a priority service. This allocation will be made on the basis of the RSVP request for this type of service.

Low Rate Start Up

Since most of the initial traffic is at a very low rate and is inherently slowed by the air interface, the initial bandwidth share for a user terminal will be at a rate of less than ⅛ of the maximum share. Given the sparse traffic during the startup period (especially if it is a DNS followed by an TCP connect) any approach that starts at full rate (even if it later reduces the allocated rate) tends to waste a significant percentage of the bandwidth.

Full Allocation When Loaded

The user terminal can determine its need to go to its full bandwidth allocation by the amount of data in its input buffers. If the user terminal includes a TCP boosting application or the IP stack on the user terminals have been optimized for satellite communications (no slow start, a long window), the user terminal will rapidly know if it is doing an upload and know that the full rate is required to clear the buffer in a reasonable time. If it is uploading, it sends a "full bandwidth" request to the BWM using bandwidth from its current allocation. The user terminal will increase its transmission rate up to the maximum allocated rate to clear the file. The upload should go smoothly and quickly from then on.

Initial Burst Allocation

When the user terminal initiates a bandwidth request, the only terminal data loading information it has is the size of the IP packet in its input buffer. When the terminal starts a session with a DNS request, the IP packet is approximately the length of the location name. The location name is usually short, but occasionally it is quite long. For lower class of service users whose minimal bandwidth rate is very low, it could take the better part of a second to send the location name. Similarly, for long interactive TCP connections (client/server, TELNET connections), the active session may restart when a new block of data needs to be transferred, thereby increasing the terminal data loading. In both of these cases, the user terminal knows how much data it has to transfer (i.e., the terminal data loading), and it is likely that this will be the only data to be uplinked during the next few seconds.

The VBP takes advantage of this situation by having the user terminal include its current total bandwidth need in the initial bandwidth request. The BWM will allocate extra bandwidth (at the user terminal's full share) for a short time to allow the user terminal to clear its buffer, and then the BWM will reduce the allocation back to the minimum rate. Obviously, if the data in the user terminal's input buffer is a small amount, the system will start the user at the minimum without the need for this early burst of higher rate bandwidth. This approach allows the system to provide better performance to the users without tying up large amounts of bandwidth. If the user terminal is at the beginning of a TCP connection, this allocation profile matches the IP activity profile. If the user terminal is in the middle of a bursty client/server connection, this profile resembles bandwidth on demand.

Combined Bandwidth Request/Initial Packet

For the TCP connection open, there may be enough space in the bandwidth request slot to hold both the bandwidth request and the initial TCP/IP SYN packet (i.e., a packet carrying a TCP/IP SYN request). In this case, the VBP would have the user terminal include this in the bandwidth request. This combination of messages shortens a user's session by one round trip.

Load Based Shutdown

Based on the "Full allocation when loaded" strategy above, the user terminal can be in one of three allocation states: full return bandwidth, minimum return bandwidth, and no return bandwidth. The last opportunity to recover unused bandwidth is the procedure used to transition from full to minimum to no bandwidth. Normally, the user terminal releases the full bandwidth when its buffers have been clear for a given period of time, T1, which is a full bandwidth shut down lag time. The value of T1 will be fairly small, in order to keep bandwidth waste low. The user terminal releases the minimum bandwidth after it has been idle for a longer period, T2. The minimum-to-no bandwidth transition lag, T2, must necessarily be held off for a longer time to allow for the delays in DNS and TCP conversations.

The values of T1 and T2 can be dependent on current system data loading. The user terminal constantly computes when its buffers will clear based on the current amount of backlogged data and the current bandwidth allocation. The BWM also provides the values of the lag times T1 and T2 to the user terminal. The user terminal calculates the point in time to initiate the release of uplink bandwidth based on the projected time when its buffer will clear and on lag times T1 and T2. The user terminal sends the full-to-minimum bandwidth transition request in anticipation of emptying its buffer and then having no further data to transmit for another T1 seconds. If more data arrives in the terminal's input buffers or its allocation rate changes, the terminal recalculates its projected transition time and sends a countermanding transition request. The BWM always regards only the last-received transition request as valid. The reason for this process is to limit the time that the terminal wastes a full bandwidth allocation. If the terminal waited until its buffer was empty and then waited some additional lag time T1' before sending a transition request, then the fullrate bandwidth allocation could not end sooner than T1'+RTT (RTT is the round-trip time between the terminal and the BWM). The VBP algorithm can cut the duration during which full bandwidth is wasted from T1'+RTT down to an arbitrarily small time. Further, this time can depend on the network conditions, with the time being longer when the network is lightly loaded and shorter when the network is heavily loaded. The BWM also can apply bandwidth release parameters to determine when bandwidth for an individual is released.

After the transition from full allocation, the user terminal will still be receiving the minimum bandwidth allocation to send late arriving data or go a full-rate allocation request if the buffers build up again. Under heavily loaded conditions, the system can operate almost as a bandwidth on demand system by setting the lag time T2 to a very small value or to zero. Under lightly loaded conditions the system can be generous with its T2 and allow the user terminal to cruise for a while. This approach allows the user terminal to maintain low level communication for a longer time during bursty client server connections.

Figure 1:
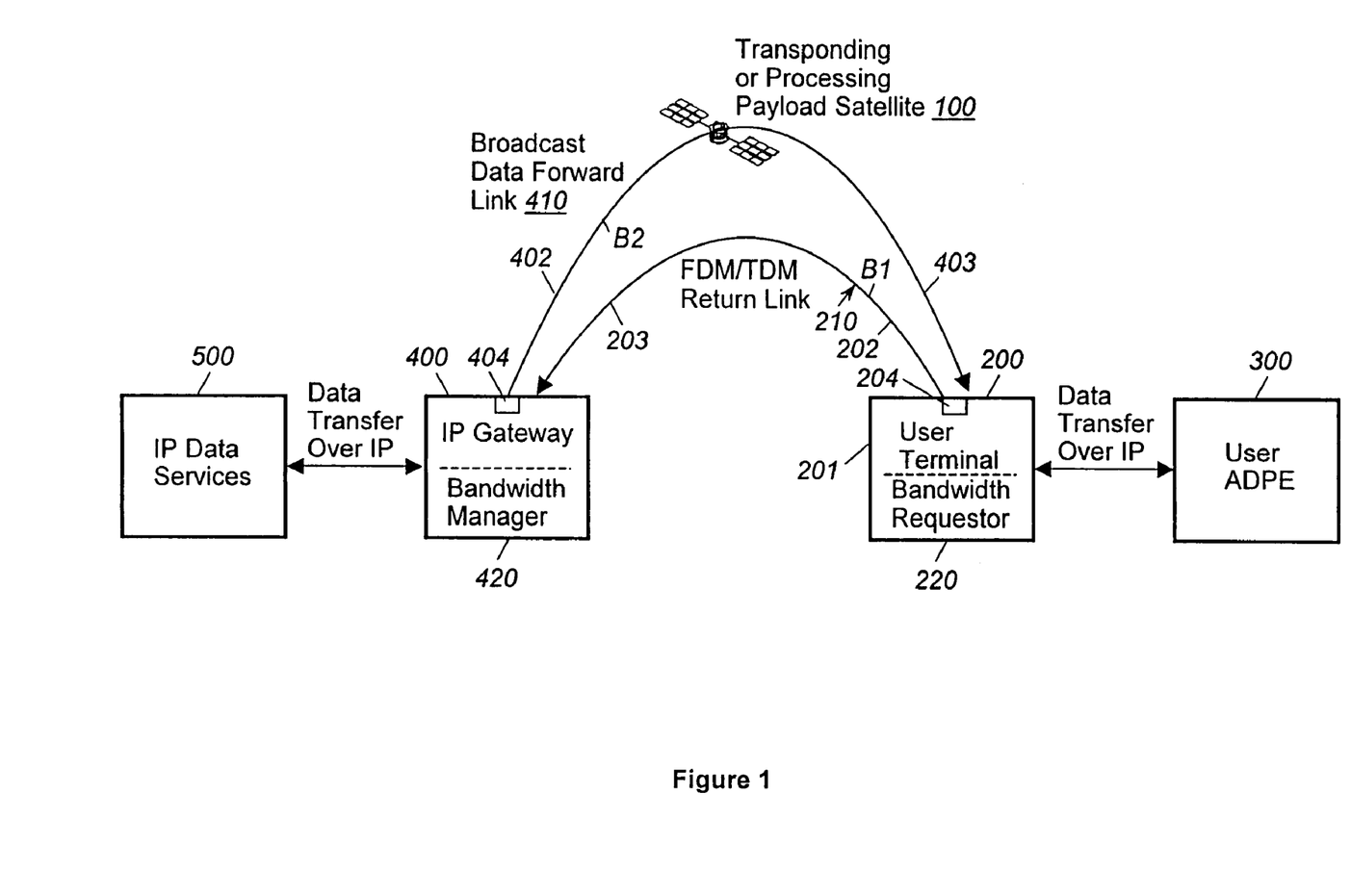
FIG. 1 is a functional block diagram of a preferred form of transmission and reception apparatus made in accordance with the invention.
Figure 2:
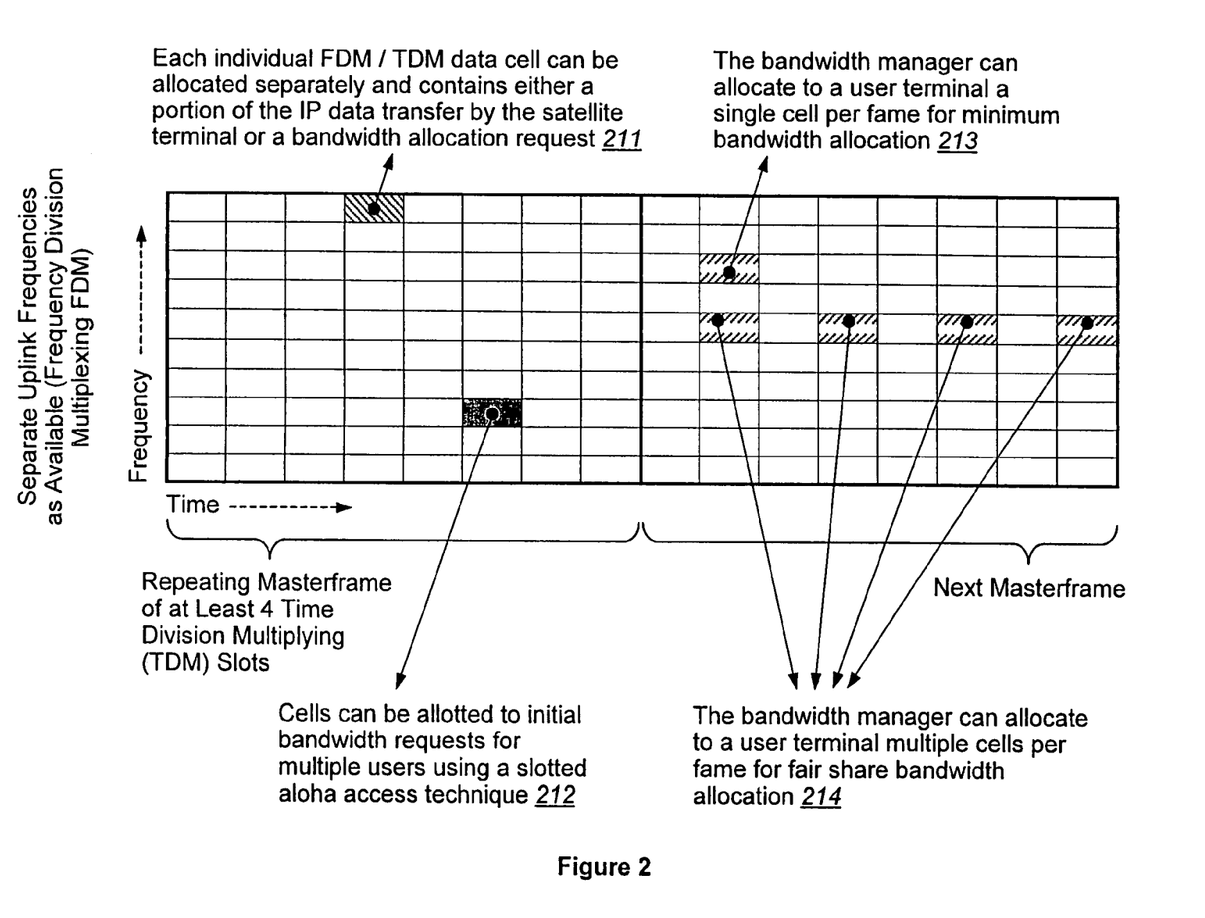
FIG. 2 illustrates a preferred form of frequency layout of uplink channelization supporting any time division multiplexing scheme for a transponder or processing payload satellite made in accordance with the preferred embodiment.

Referring to FIG. 1, a preferred form of the invention includes a processing or transponding satellite 100 usually in a geostationary orbit. Satellite 100 receives data from multiple user terminals in a frequency division multiplexing (FDM), time division multiplexing (TDM) formatted stream. An exemplary user terminal 201 is one of multiple user terminals. The user data is transmitted to an IP gateway 400 via satellite 100 by a return link 210 including an uplink 202 and a downlink 203. An uplink unit 204 in terminal 201 transmits the data to satellite 100 on a beam B1 forming part of uplink 202. FIG. 2 shows details of the uplink of return link 210. User terminal (UT) 201 contains a bandwidth requestor 220 and an IP based interface to a user Automatic Data Processing Equipment (ADPE) 300, such as a personal computer (PC).

Return link 210 is forwarded by satellite 100 to an IP gateway 400. The gateway extracts bandwidth requests for its local bandwidth manager 420 and sends the user's IP stream on to connected IP services 500. IP data is transmitted to multiple user terminals via satellite 100 by a forward link 410 that includes an uplink 402 and a downlink 403. An uplink unit 404 in IP gateway 400 transmits the IP data to satellite 100 on a beam B2 forming part of uplink 402. Since there is a single source of data, the IP gateway's forward link 410 can be a single broadcast stream which may be formatted in any suitable manner for carrying IP data (i.e., MPEG using the DUB-S standard, ATM, or a special purpose packet format). The bandwidth allocations provided by the bandwidth manager 420 at the IP gateway 400 are multiplexed into the forward link 410 with the IP data.

FIG. 2 shows the preferred form of the uplink manager with the variable bandwidth protocol (VBP). The uplink 202 of return link 210 can be any combination of a frequency division multiplexing (FDM) and time division multiplexing (TDM) format with FDM/TDM data cells, such as cell 211 (FIG. 2), that can individually be allocated to multiple user terminals. The frequency divisions can be as few or as many as are possible within the allocated spectrum and the capabilities of the multiple user terminals. The time division should allow an allocation of a fraction of the frequency to allocation of all the cells, such as cell 211, in an FDM division for a period of time. The nominal approach is to create repeating master frames of over four TDM slots per frame and allocate uplink by frequency, frame position and starting and end frame IDs. User terminals with no current uplink bandwidth allocation use shared cells and a slotted aloha access technique 212 (FIG. 3) to request bandwidth. User terminals operating at minimum uplink bandwidth allocation 213 (FIG. 3) are allocated one cell per master frame. User terminals operating at full bandwidth 214 (FIG. 4) are allocated multiple cells per frame.

Still referring to FIG. 2, each individual FDM/TDM data cell can be allocated separately and contains either a portion of the IP data transfer by the satellite terminal or a bandwidth allocation request 211. Cells can be allotted to initial bandwidth requests for multiple user terminals using a slotted aloha access technique 212. The bandwidth manager (BWM) can allocate to a user terminal a single cell per frame for minimum bandwidth allocation 213. The BWM can allocate to a user terminal multiple cells per frame for fair share bandwidth allocation 214.

Figure 3:
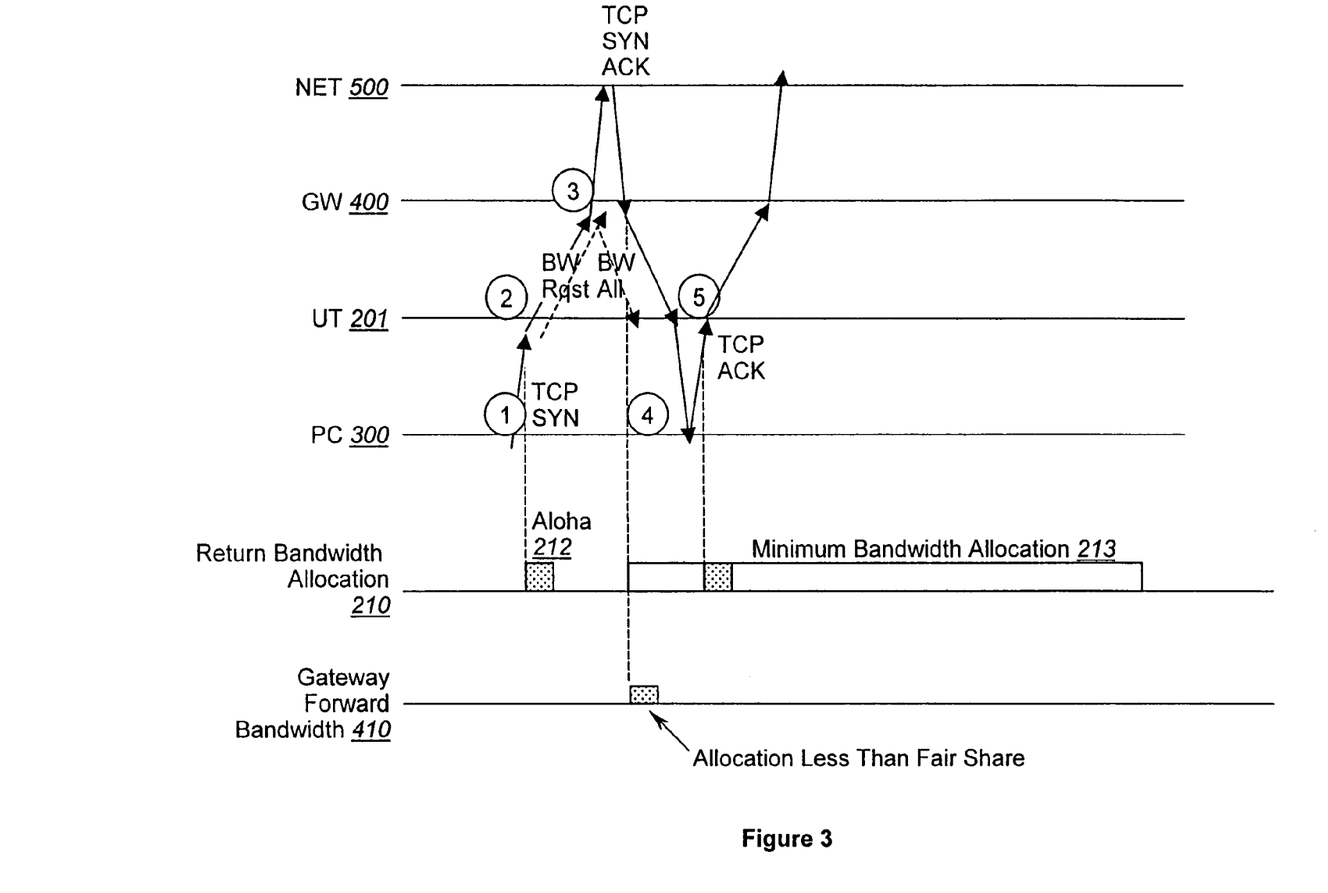
FIG. 3 is a flow diagram illustrating a startup mode of operation during which initial delivery data can be piggy backed with a bandwidth request.

Referring to FIG. 3, the quickest startup of a data transfer process is achieved when the initial delivery data comprising delivery information can be piggybacked with a bandwidth request. In step 1, user device 300 (FIG. 1), which may be a personal computer (PC), starts the process by sending delivery data, such as a Net IP packet, to the user terminal (UT) 201 (FIG. 1) for transfer. In this case, we have selected a TCP SYN packet requesting a connection with a known IP address. This address could be a previously resolved DNS or a file transfer server.

In step 2, terminal (UT) 201 requests bandwidth based on the arrival of this IP packet in its input buffer (not shown). Terminal (UT) 201 knows only the size of the packet to be transferred. In this case, the packet fits in the bandwidth (BW) request cell so it is included. The request is sent in an aloha channel 212 (FIG. 3)(i.e., a transmission system using time division multiple access (TDMA)).

In step 3, gateway (GW) 400 recognizes the BW request as a piggybacked request. It extracts the IP packet and sends it on while it grants terminal 201 minimum bandwidth.

In step 4, the bandwidth grant precedes the response to the TCP SYN but terminal (UT) 201 now has the knowledge that the aloha has succeeded.

In step 5, the return bandwidth is used to complete the TCP connection, and real data (i.e., information to be transferred, such as a file) is ready to flow.

Figure 4:
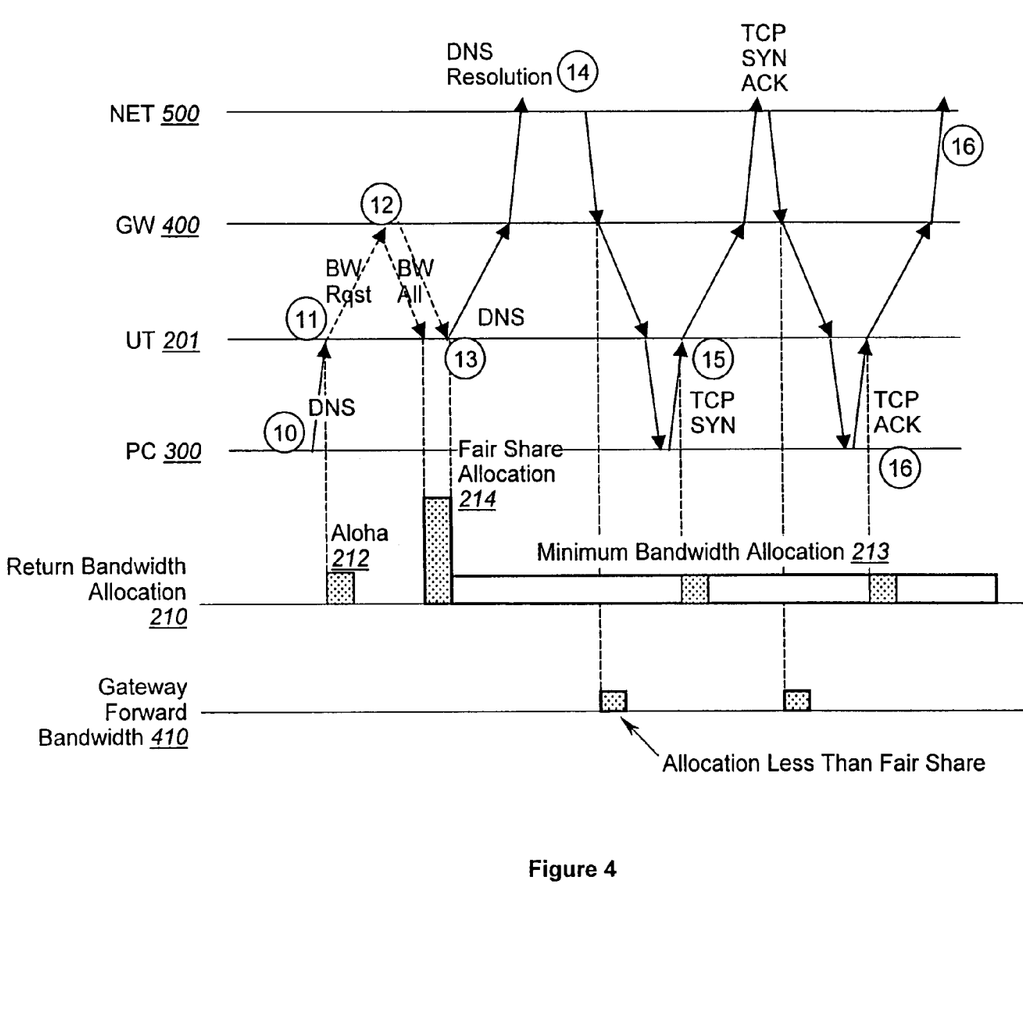
FIG. 4 is a flow diagram illustrating a startup mode of operation during which initial delivery data cannot be piggy backed with a bandwidth request.

Referring to FIG. 4, when an initial IP packet does not fit in the request, terminal (UT) 201 identifies its current data need.

In step 10, user device 300 starts the process by sending delivery data, such as a DNS, to terminal (UT) 201 for transfer.

In step 11, terminal (UT) 201 requests bandwidth based on the arrival of this IP packet. Terminal 201 holds the DNS request and sends a request that specifies minimum bandwidth with a current backlog the size of the DNS. The request is sent in an aloha channel 212 (FIG. 3).

In step 12, the gateway 400 recognizes the BW request. It provides a very short burst of bandwidth at the terminals fair share rate 214 followed by a minimum bandwidth allocation 213. A terminal's fair share bandwidth is determined by the BWM according to the following expression:

$$\text{UserFairShare}^{Individual} = \text{UserSubscribedBandwidth}_{Individual} \star \text{AvailableBandwidth}/\text{Sum}(\text{UserSubscribedBandwidth}_{Requesting})$$

where $\text{UserFairShare}_{Individual}$ comprises the bandwidth allocated to the individual terminal (e.g., 201), $\text{UserSubscribedBandwidth}_{Individual}$ comprises the bandwidth allowed the individual terminal by the agreement terms, AvailableBandwidth comprises the amount of uplink bandwidth available after the minimum bandwidth and signaling channels are allocated, and $\text{UserSubscribedBandwidth}_{Requesting}$ comprises the bandwidth allowed each of the user terminals requesting fair share bandwidth by the agreement terms.

In step 13, terminal (UT) 201 transmits the DNS using the initial fair share burst 214.

In step 14, the DNS is resolved by a hierarchical set of name servers in the IP services 500 to provide the IP address back to PC 300.

In step 15, the TCP connect process is resolved using the minimum bandwidth allocation 213.

In steps 16, the connection is established and data to be transferred, such as a file, may flow. (Note: the PC's TCP acknowledgement (ACK) is usually accompanied by the application level request.)

Figure 5:
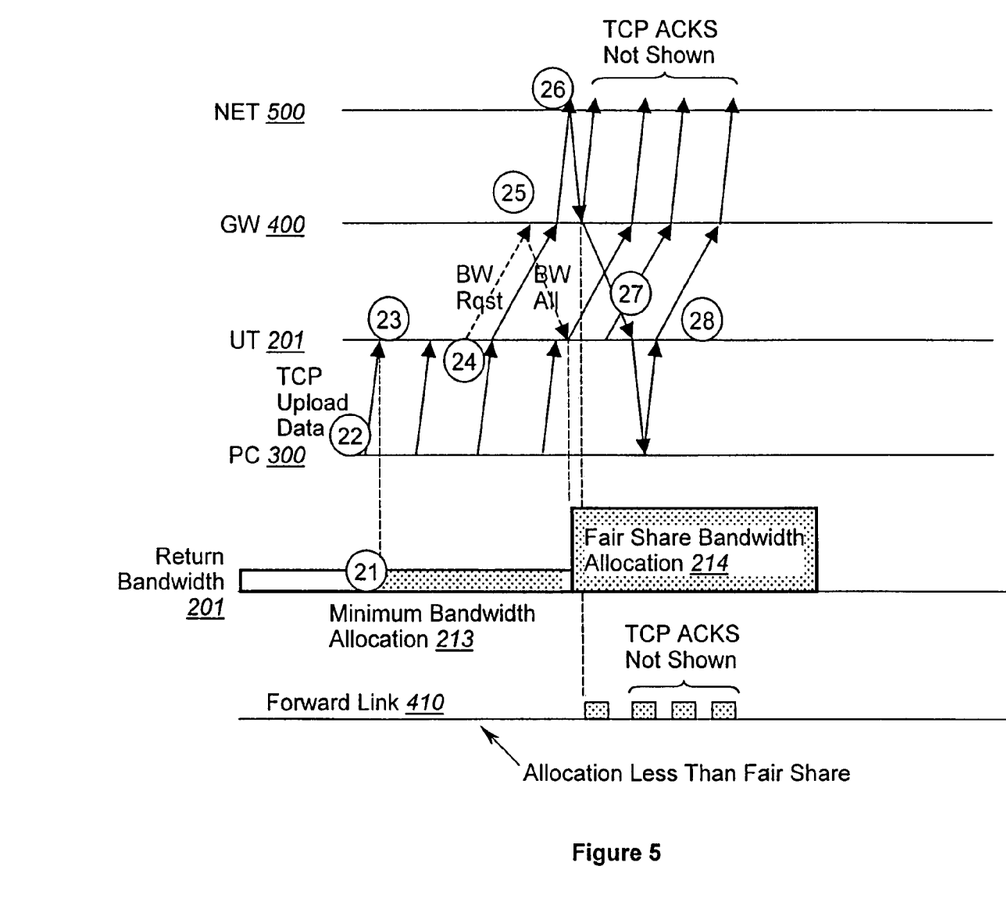
FIG. 5 is flow diagram illustrating a mode of operation during which a user terminal tracks a data backlog to determine a point in time at which full bandwidth should be used for data delivery.

Referring to FIG. 5, while operating with minimal bandwidth, terminal (UT) 201 tracks the backlog to determine when it should go to full bandwidth.

In step 21, terminal (UT) 201 is running at minimum bandwidth.

In step 22, PC 300 begins a data transfer. Awaiting the TCP ACKs, the PC 300 continues to send the packets.

In step 23, terminal (UT) 201 begins the transfer of the packets using the minimum return bandwidth 213. It constantly computes when it will finish with the current data based on the current transmission rate.

In step 24, the finish time exceeds the current system data loading threshold sent in the forward control stream 410, and terminal (UT) 201 inserts a full bandwidth request into the return link. The terminal also provides the backlog information.

In step 25, the gateway 400 authorizes and allocates full bandwidth 214.

In step 26, the first IP packet clears and the receiver sends the first ACK.

In step 27, the backed up IP packets are transferred on uplink 202 using the fair share bandwidth 214.

In step 28, the system continues the transfer.

Varying the bandwidth of the uplink is accomplished by bandwidth manager 420 (FIG. 1). The bandwidth can be adjusted by changing the number of traffic bursts assigned to a data transfer, or by changing the number of cells assigned to the data transfer 214, or both.

Figure 6:
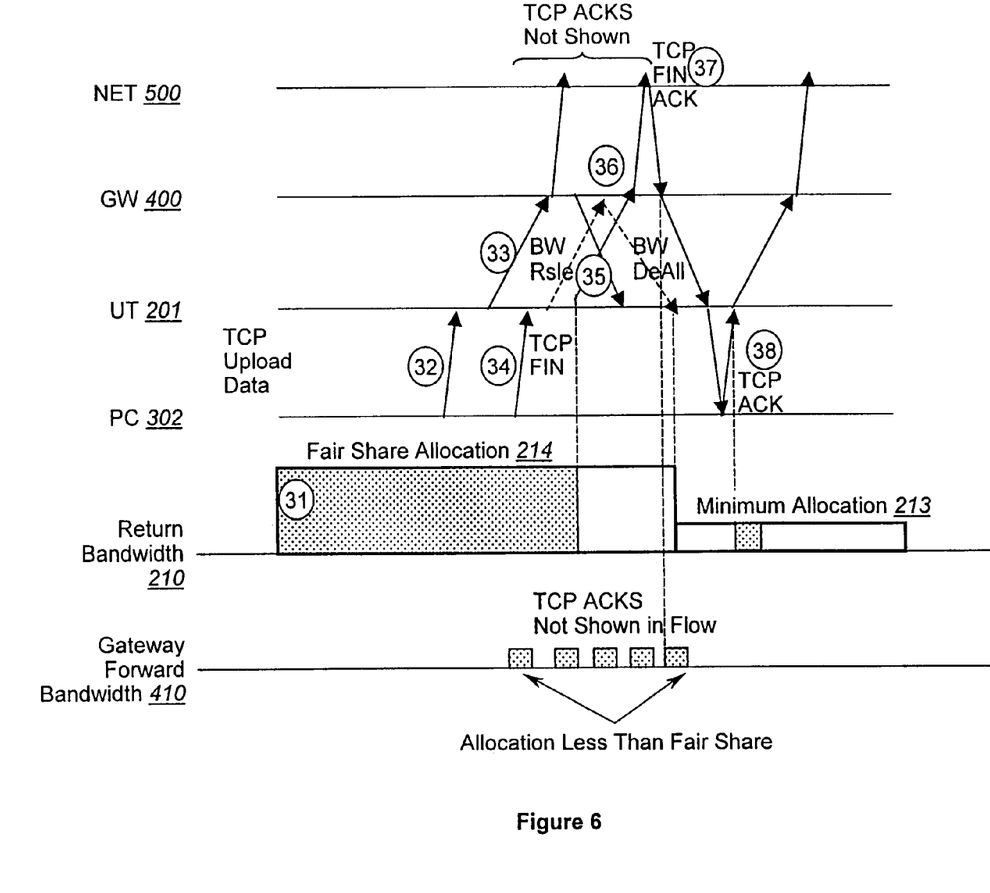
FIG. 6 is a flow diagram illustrating a mode of operation during which a user terminal tracks the time at which it expects to run out of data to transmit at full bandwidth and sends a shut down request to match the system lag time.

Referring to FIG. 6, terminal (UT) 201 tracks the time at which it expects to run out of transfer data at the fair share rate 214 and sends a shut down request to match the system lag time.

In step 31, terminal (UT) 201 is running at the fair share bandwidth 214.

In step 32, PC 300 continues a data transfer. IP packets are about 1 K byte each.

In step 33, terminal (UT) 201 transfers the packets at maximum rate (i.e., bandwidth) after a small residency in its input buffer. The UT is constantly computing when it would be finished at the current rate (i.e., bandwidth).

In step 34, the last data packet comes in from the PC 300.

In step 35, terminal (UT) 201's finish computation exceeds the current system provided lag time. Terminal (UT) 201 inserts a full bandwidth release into the data stream and continues to transmit the data.

In step 36, the gateway 400 gets the release and allocates the bandwidth to the terminal at the minimum rate 213.

In step 37, the last packet reaches the destination, and the destination responds to the TCP close with a TCP FIN ACK.

In step 38, PC 300 replies with the final ACK, and the TCP session is done.

Full return de-allocation operation, as illustrated in FIG. 6, is dependent on the system provided shut down lag time. Terminal (UT) 201 and/or the gateway must be aware of RSVP services and not shutdown dedicated bandwidth. Since IP packets from PC 300 are discrete events, lag time must be long enough to allow PC 300 to insert new packets without a shutdown request. With return rates of 16, 32, and 64 kbps, a 1 K packet clears in ½, ¼, and ⅛ of a second.

Figure 7:
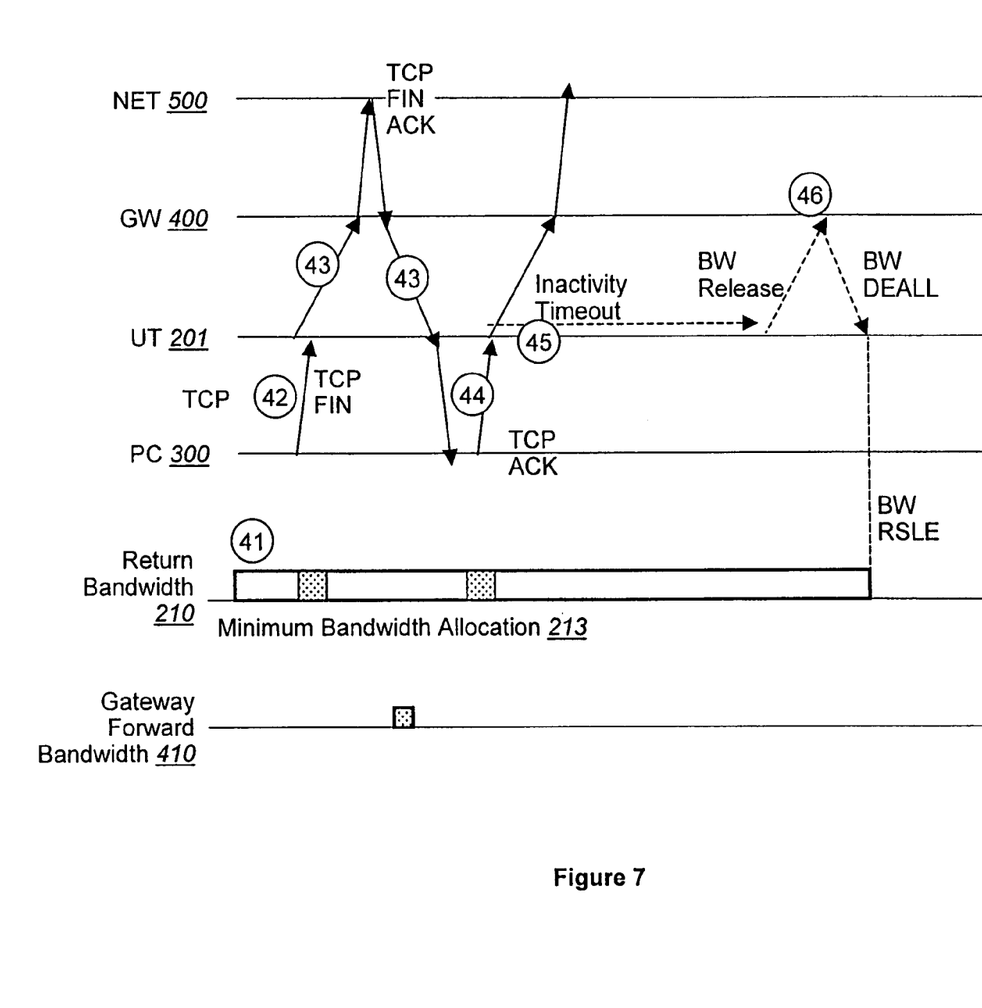
FIG. 7 is a flow diagram illustrating a mode of operation during which a user terminal sets an inactivity timeout so that when a data transfer is completed, the timeout elapses and releases bandwidth.

Referring to FIG. 7, terminal (UT) 201 sets an inactivity timeout. When the data transfer is over, the timeout will elapse and release the minimum bandwidth allocation 213.

In step 41, terminal (UT) 201 is running at minimum bandwidth 213.

In step 42, PC 300 sends its last packet—TCP FIN.

In step 43, terminal (UT) 201 transfers the packet at a minimum rate 213. Terminal (UT) 201 computes when it would be finished at the current rate (i.e., bandwidth).

In step 44, the last data packet (a TCP FIN ACK) comes to PC 300.

In step 45, PC 300 sends the last packet of the session, a TCP ACK.

In step 46, terminal (UT) 201's last inactivity timeout begins and ends without additional data. The gateway gets the release and deallocates the bandwidth.

Figure 8:
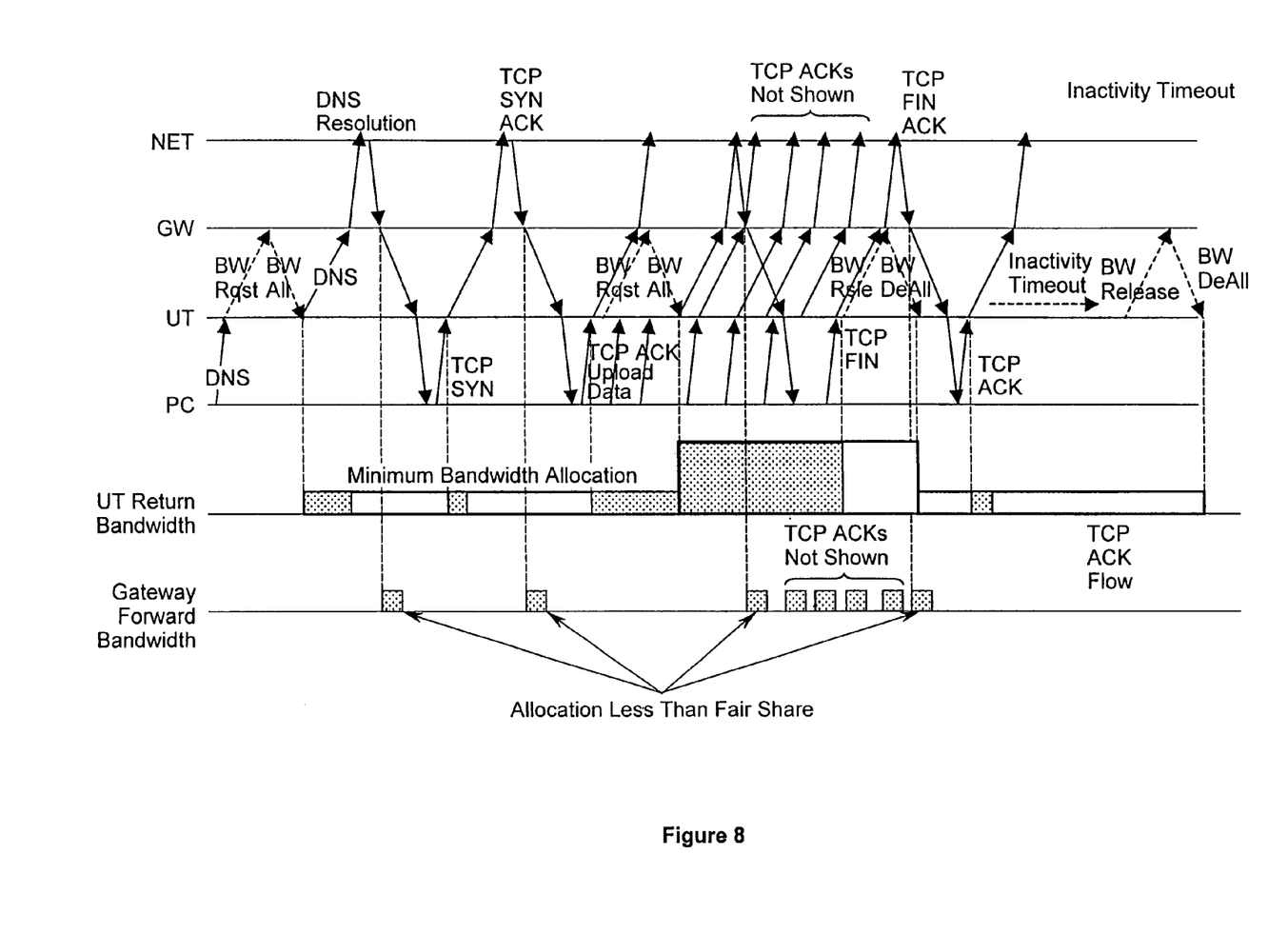
FIG. 8 is a flow diagram illustrating a mode of operation during which upload operates like download but with higher usage of return.
Figure 9:
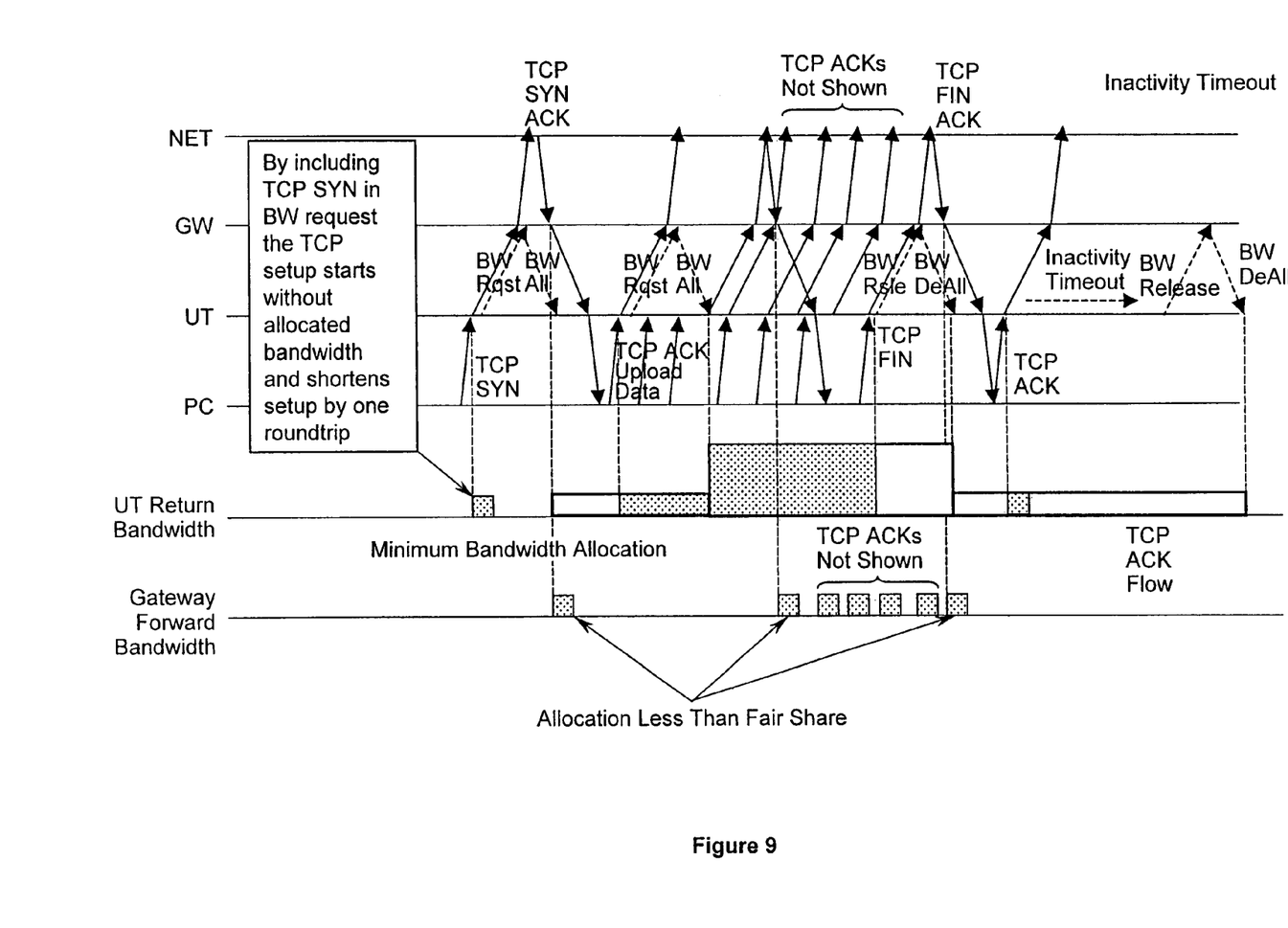
FIG. 9 is a flow diagram illustrating a shortened version of an FTP/HTTP upload.
Figure 10:
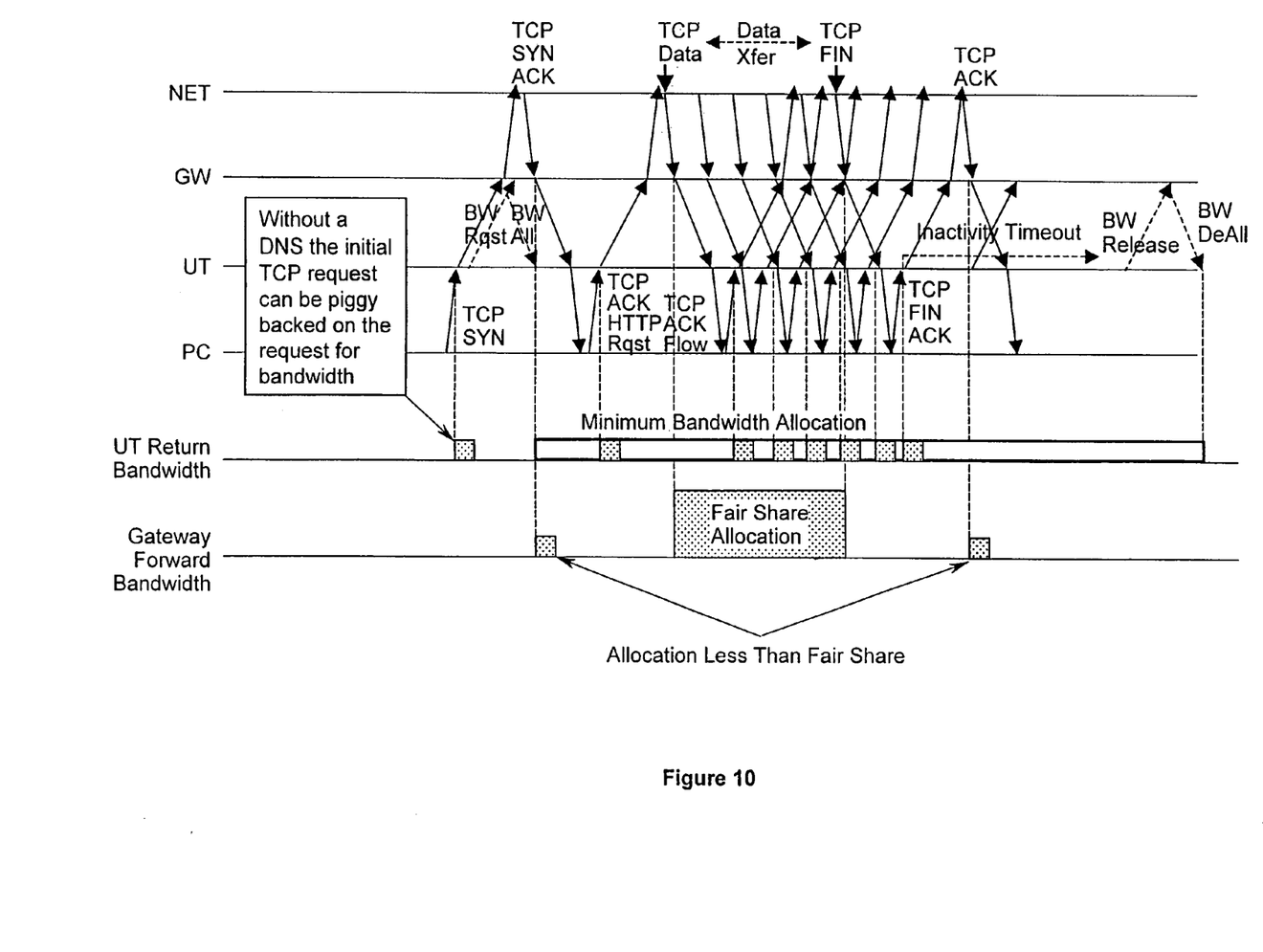
FIG. 10 is a flow diagram illustrating a shortened version of an FTP/HTTP download.

Those skilled in satellite communications will readily understand FIGS. 8–10 based on the previous discussion. FIG. 8 illustrates an upload which operates like a download but with higher usage of return (i.e., uplink). FIG. 9 illustrates a shortened version of an FTP/HTTP upload. FIG. 10 illustrates a shortened version of an FTP/HTTP download.

Those skilled in the art will recognize that the preferred form of the invention described above may be altered and modified without departing from the true spirit and scope of the invention as defined in the accompanying claims.

What is claimed is:

1. A method of allocating uplink bandwidth among user terminals in a satellite communication system including an uplink, the method comprising:

assigning initial bandwidth allocations of the uplink bandwidth for one or more of the user terminals;

assigning fair shares of the uplink bandwidth allocated to one or more of the user terminals based on at least one of system data loading, terminal data loading, and user agreement terms; and releasing uplink bandwidth previously allocated to one or more of the user terminals based on a projected release time associated with completing transmission of data in a buffer of the one or more user terminals.

2. A method according to claim 1, wherein said assigning initial bandwidth allocations comprises:

determining initial bandwidth needs at one or more of said user terminals in response to data activity at said one or more user terminals;

transmitting initial bandwidth requests from one or more of the user terminals to a bandwidth manager; and transmitting the initial bandwidth allocations to one or more of the user terminals.

3. A method according to claim 2, wherein the uplink comprises at least one allocated signaling channel and wherein transmitting initial bandwidth requests comprises communicating over the allocated signaling channel.

4. A method according to claim 2, wherein transmitting initial bandwidth requests comprises communicating over the initial bandwidth allocations in the uplink.

5. A method according to claim 1, wherein the satellite communication system is arranged to transmit data via a fixed bandwidth, and wherein the method further comprises identifying a need for a fixed bandwidth based on the data to be transmitted over the satellite communication system.

6. A method according to claim 2, wherein transmitting initial bandwidth requests comprises transmitting initial minimal bandwidth allocation requests based on the data to be transmitted over the satellite communication system.

7. A method according to claim 2, wherein transmitting initial bandwidth requests comprises transmitting a request from a first terminal of said user terminals for a fixed amount of bandwidth at the first terminal's allocated fair share of the uplink bandwidth based on the data to be transmitted over the satellite communication system.

8. A method according to claim 1, wherein assigning fair shares of the uplink bandwidth comprises transmitting a request from a first terminal of said user terminals for bandwidth at the first terminal's fair share of the uplink bandwidth based on the data to be transmitted over the satellite communication system.

9. A method according to claim 1, wherein releasing uplink bandwidth comprises transmitting a request from a first terminal of said user terminals to reduce allocated bandwidth of the first terminal from bandwidth at the first terminal's fair share to a minimal communication rate based on the data to be transmitted over the satellite communication system and bandwidth manager provided lag time.

10. A method according to claim 1, wherein releasing uplink bandwidth comprises transmitting a request from a first terminal of said user terminals for reducing allocated bandwidth from minimal communication rate to no allocated bandwidth based on the data to be transmitted over the satellite communication system and bandwidth manager provided lag time.

11. A method according to claim 2, wherein transmitting initial bandwidth requests comprises combining the initial bandwidth request of a first terminal of said user terminals with initial data to be transferred by the first terminal.

12. A method according to claim 2, wherein transmitting the initial bandwidth allocations to the one or more user terminals further comprises transmitting the initial bandwidth allocations from the bandwidth manager.

13. A method according to claim 2, wherein the satellite communication system comprises a downlink and wherein transmitting the initial bandwidth allocations to the one or more user terminals comprises communicating over a signaling channel allocated in the downlink to said one or more user terminals.

14. A method according to claim 5, further comprising allocating a fixed bandwidth to a first terminal of the user terminals in response to a request for a fixed bandwidth from the first terminal to a bandwidth manager.

15. A method according to claim 7, further comprising allocating to the first terminal a fixed amount of bandwidth at the first terminal's allocated fair share of the uplink bandwidth based on the data to be transmitted over the satellite communication system.

16. A method according to claim 8, further comprising allocating to the first terminal bandwidth at the first terminal's fair share of the uplink bandwidth based on the data to be transmitted over the satellite communication system.

17. A method according to claim 10, further comprising de-allocating all bandwidth to the first terminal.

18. A method according to claim 1, further comprising allocating minimum bandwidth to one or more of said user terminals and allocating one or more signaling channels in said uplink, wherein an individual terminal of said user terminals is subject to said agreement terms, wherein the individual terminal requests fair share bandwidth and wherein assigning fair shares comprises computing the fair share bandwidth for the individual terminal as:

$$\text{UserFairShare}_{Individual} = \text{UserSubscribedBandwidth}_{Individual} * \text{AvailableBandwidth} / \text{Sum}(\text{UserSubscribedBandwidth}_{Requesting})$$

wherein UserFairShare$_{Individual}$ comprises a bandwidth allocated to the individual terminal, UserSubscribedBandwidth$_{Individual}$ comprises a bandwidth allowed the individual terminal by the agreement terms, AvailableBandwidth comprises an amount of uplink bandwidth available after said minimum bandwidth and signaling channels are allocated, and UserSubscribedBandwidth$_{Requesting}$ comprises a bandwidth allowed each of the user terminals requesting fair share bandwidth by the agreement terms.

19. A method according to claim 9, wherein releasing uplink bandwidth comprises:

providing to said user terminals a full bandwidth shut down lag time; and computing a point of time for initiating said releasing uplink bandwidth based on the system data loading and said lag time.

20. A method according to claim 10, wherein reducing allocated bandwidth comprises:

providing to said user terminals a full bandwidth shut down lag time; and computing a point of time for initiating said reducing allocated bandwidth based on the system data loading and said lag time.

21. A method according to claim 1, wherein assigning initial bandwidth allocations for the one or more user terminals comprises assigning an initial bandwidth that is a portion of the fair share of the bandwidth for the one or more user terminals.

22. A method according to claim 1, further comprising calculating the projected release time by the one or more user terminals based on both an amount of the data in the buffer of the one or more user terminals and a lag time provided by a bandwidth manager.

23. A method according to claim 22, further comprising recalculating the projected release time in response to a change in the amount of the data in the buffer of the one or more user terminals.

24. An apparatus for allocating uplink bandwidth in a satellite communication system including an uplink, the apparatus comprising:
    user terminals subject to terminal data loading; and
    a bandwidth manager storing bandwidth release parameters, said manager being arranged to assign initial bandwidth allocations of the uplink bandwidth for one or more of the user terminals;
    wherein the bandwidth manager assigns fair shares of the uplink bandwidth allocated to one or more of the user terminals based on at least one of system data loading, terminal data loading and user agreement terms; and
    wherein the bandwidth manager releases uplink bandwidth previously allocated to one or more of the user terminals based on a projected release time associated with completing transmission of data in a buffer of the one or more user terminals.

25. Apparatus according to claim 24, wherein said manager is arranged to
    determine initial bandwidth needs at one or more of said user terminals in response to data activity at said one or more user terminals;
    transmit initial bandwidth requests from one or more of the user terminals to the bandwidth manager; and
    transmit the initial bandwidth allocations to one or more of the user terminals.

26. Apparatus according to claim 25, wherein the uplink comprises at least one allocated signaling channel and wherein the manager is arranged to communicate over the allocated signaling channel.

27. Apparatus according to claim 25, wherein the manager is arranged to communicate over the initial bandwidth allocations in the uplink.

28. Apparatus according to claim 25, wherein the terminals are arranged to transmit initial minimal bandwidth allocation requests based on the data to be transmitted over the satellite communication system.

29. Apparatus according to claim 25 wherein a first terminal of the user terminals is arranged to transmit requests for a fixed amount of bandwidth at the first terminal's allocated fair share of the uplink bandwidth based on the data to be transmitted over the satellite communication system.

30. Apparatus according to claim 29, wherein the manager is arranged to allocate bandwidth to the first terminal of the user terminals in response to a request for a fixed bandwidth from the first terminal to the manager.

31. Apparatus according to claim 29, wherein the manager is arranged to allocate to the first terminal a fixed amount of bandwidth at the first terminal's allocated fair share of the uplink bandwidth based on the data to be transmitted over the satellite communication system.

32. Apparatus according to claim 25, wherein a first terminal of the user terminals is arranged to combine the initial bandwidth request with initial data to be transferred by the first terminal.

33. Apparatus according to claim 25, wherein the manager is arranged to transmit the initial bandwidth allocations to the user terminals.

34. Apparatus according to claim 25, wherein the satellite communication system comprises a downlink and wherein the manager is arranged to transmit the initial bandwidth allocations to the one or more user terminals by communicating over a signaling channel allocated in the downlink.

35. Apparatus according to claim 24, wherein the satellite communication system is arranged to transmit data via a fixed bandwidth, and wherein the terminals are arranged to identify a need for a fixed bandwidth based on the data to be transmitted over the satellite communication system.

36. Apparatus according to claim 24, wherein a first terminal of said user terminals transmit a request for bandwidth at the first terminal's fair share of the uplink bandwidth based on the data to be transmitted over the satellite communication system.

37. Apparatus according to claim 36, wherein the manager is arranged to allocate to the first terminal bandwidth at the first terminal's fair share of the uplink bandwidth based on the data to be transmitted over the satellite communication system.

38. Apparatus according to claim 24, wherein said manager stores lag time and wherein a first terminal of said user terminals transmits a request to reduce allocated bandwidth of the first terminal from bandwidth at the first terminal's fair share to a minimal communication rate based on the data to be transmitted over the satellite communication system and the lag time.

39. Apparatus according to claim 38, wherein the manager is arranged to:
    provide to said user terminals a full bandwidth shut down lag time; and
    compute a point of time for initiating said request to reduce uplink bandwidth based on the system data loading and said lag time.

40. Apparatus according to claim 24, wherein the manager stores a lag time and wherein a first terminal of said user terminals transmits a request for reducing allocated bandwidth from a minimal communication rate to no allocated bandwidth based on the data to be transmitted over the satellite communication system and the lag time.

41. Apparatus according to claim 40, wherein the manager is arranged to de-allocate all bandwidth to the first terminal.

42. Apparatus according to claim 40, wherein the manager is arranged to:
    provide to said user terminals a full bandwidth shut down lag time; and
    compute a point of time for initiating said request for reducing allocated bandwidth based on the system data loading and said lag time.

43. Apparatus according to claim 24, wherein the manager is arranged to allocate minimum bandwidth to one or more of said user terminals and to allocate one or more signaling channels in said uplink, wherein an individual terminal requests fair share bandwidth and wherein the manager is arranged to assign fair share according to the expression $$\text{UserFairShare}_{Individual} = \text{UserSubscribedBandwidth}_{Individual} * \text{AvailableBandwidth} / \text{Sum}(\text{UserSubscribedBandwidth}_{Requesting})$$

wherein $\text{UserFairShare}_{Individual}$ comprises a bandwidth allowed the individual terminal by the agreement terms, $\text{UserSubscribedBandwidth}_{Individual}$ comprises a bandwidth allowed the individual terminal by the agreement terms, AvailableBandwidth comprises an amount of uplink bandwidth available after said minimum bandwidth and signaling channels are allocated, and $\text{UserSubscribedBandwidth}_{Requesting}$ comprises a bandwidth allowed each of the user terminals requesting fair share bandwidth by the agreement terms.

44. A method of allocating uplink bandwidth among user terminals in a satellite communication system including an uplink, the method comprising:

assigning initial bandwidth allocations of the uplink bandwidth for one or more of the user terminals;

assigning fair shares of the uplink bandwidth allocated to one or more of the user terminals based on at least one of system data loading, terminal data loading, and user agreement terms;

transmitting a request from a first terminal of the user terminals to reduce allocated bandwidth of the first terminal from a first bandwidth to a second bandwidth based on the data to be transmitted over the satellite communication system and a lag time provided by the bandwidth manager; and releasing uplink bandwidth previously allocated to one or more of the user terminals based on at least one of the terminal data loading and bandwidth release parameters.

45. A method according to claim 44, wherein the first bandwidth comprises bandwidth at the first terminal's fair share and the second bandwidth comprises a minimal communication rate.

46. A method according to claim 44, wherein the first bandwidth comprises a minimal communication rate and the second bandwidth comprises no allocated bandwidth.

* * * * *